United States Patent [19]

Prewitt

[11] Patent Number: 5,295,799
[45] Date of Patent: Mar. 22, 1994

[54] PELLET FORMING APPARATUS
[75] Inventor: Neil Prewitt, Grosse Ile, Mich.
[73] Assignee: Diversey Corporation, Wyandotte, Mich.
[21] Appl. No.: 309,403
[22] Filed: Feb. 13, 1989
[51] Int. Cl.⁵ ............................................. B29C 39/38
[52] U.S. Cl. ............................................. 425/8; 264/8; 264/13; 264/163; 264/142; 425/294; 425/308; 425/DIG. 101; 425/377; 425/382.3; 425/143
[58] Field of Search ............... 264/5, 8, 12, 13, 14, 264/67, 144, 349, 142, 163; 425/6, 8, 382 R, 331, DIG. 113, 308, 143, DIG. 101, 382.3, 377, DIG. 230, 464, 294

[56] References Cited

U.S. PATENT DOCUMENTS

| | | |
|---|---|---|
| 2,268,888 | 1/1942 | Mericola . |
| 2,391,638 | 12/1945 | Meakin ............................ 425/382 |
| 2,979,764 | 4/1961 | Andrew ........................... 425/464 |
| 3,208,101 | 9/1965 | Kaiser et al. ........................ 425/6 |
| 4,156,495 | 5/1979 | Weinhold ................. 425/DIG. 230 |
| 4,559,000 | 12/1985 | Froershke ............................ 425/6 |
| 4,578,021 | 3/1986 | Schermutzki ......................... 425/6 |
| 4,610,615 | 9/1986 | Froeschke .......................... 264/8 |

FOREIGN PATENT DOCUMENTS

| | | | |
|---|---|---|---|
| 1129164 | 8/1982 | Canada ............................. 264/13 |
| 3623157A | 12/1986 | Fed. Rep. of Germany ........ 264/13 |
| 63-162030 | 7/1988 | Japan .............................. 425/6 |

Primary Examiner—Jeffery Thurlow
Assistant Examiner—Mathieu Vargot
Attorney, Agent, or Firm—Weintraub DuRoss & Brady

[57] ABSTRACT

An apparatus for forming pellets in which a medium to be pelletized is delivered to a distribution box, the distribution box intermittently expelling discrete portions of the medium outwardly to form droplets. A conveyor moves the droplets away from the distribution box, the droplets solidifying into pellets as they travel along the conveyor.

9 Claims, 1 Drawing Sheet

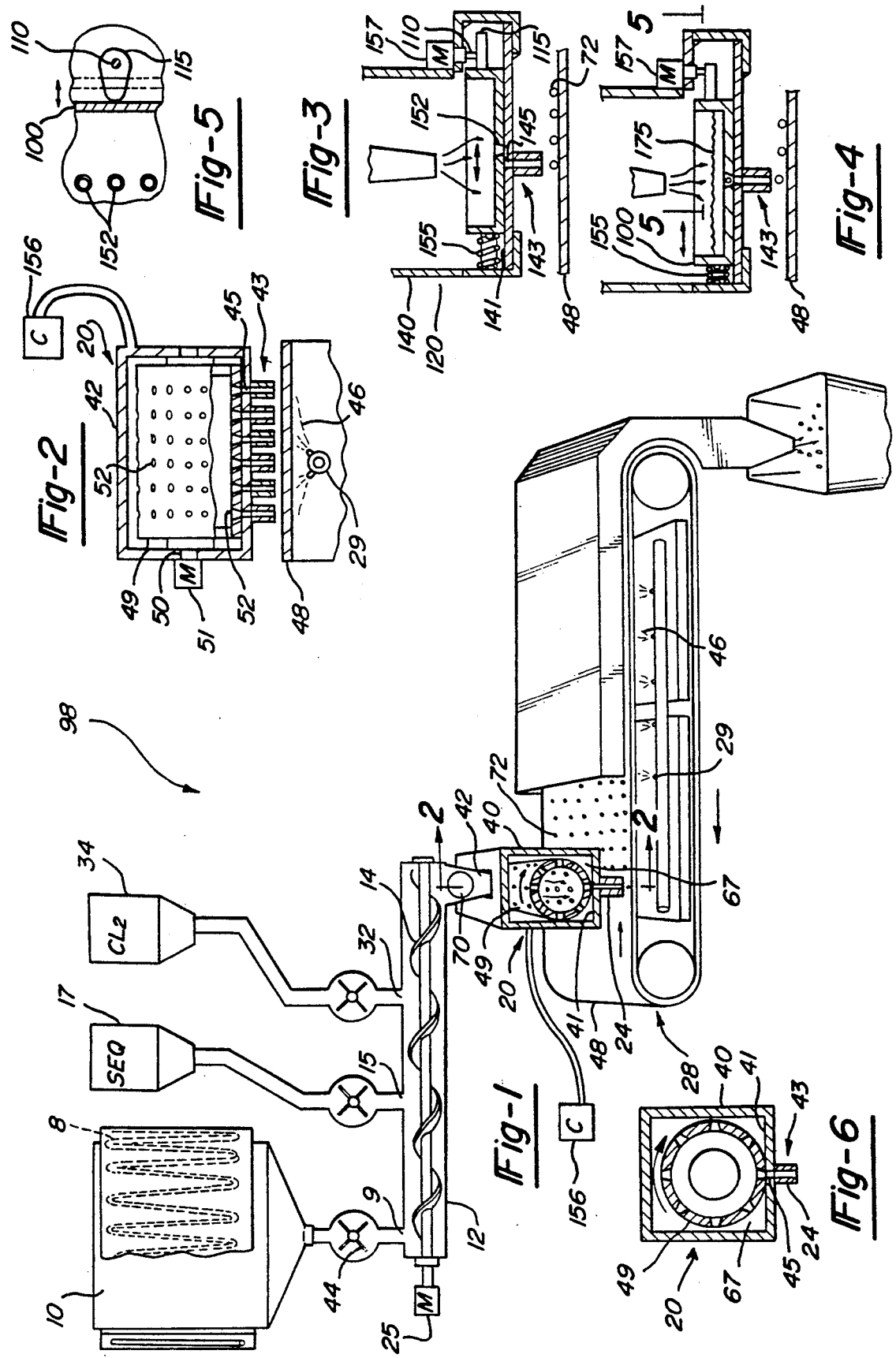

PELLET FORMING APPARATUS

BACKGROUND OF THE INVENTION

1. Field of the Invention

The present invention relates to an apparatus for forming pellets from a liquid or flowable medium. More particularly, the present invention relates to such an apparatus in which a medium to be pelletized is delivered to a distribution box and the distribution box comprises means for intermittently expelling portions of the medium to form pellets.

2. Prior Art

There is a need in the art for an apparatus which can reliably, efficiently and consistently produce high quality pellets from a medium. In particular, a need exists in the cleaning products industry for an apparatus which is capable of mixing two or more components to create a mixture, raising the temperature of the mixture to partially or completely liquefy the mixture, and forming pellets from the mixture in a reliable high-volume application.

A brief summary of some previos pellet forming devices follows.

Perky, U.S. Pat. No. 1,022,501, discloses a machine for processing grain into filaments. The grain is preferably cooked before being processed by the machine of Perky. The cooked grain is pressurized by a hand press and the pressure forces the grain out of holes in the sides of a hollow cylinder.

Meakin, U.S. Pat. No. 2,391,638, discloses an apparatus for making pellets, which is particularly directed to pelletizing material such as sodium, magnesium or gun powder which is dangerous to handle in the presence of oxygen. In the apparatus of Meakin, an extrusion chamber is defined by a cylindrical die having a plurality of holes formed therein. A shaft coupled to the cylindrical die rotates the die. A feed screw feeds material to be pelletized into the interior of the die and an extrusion roller is located in a fixed position within the die below the feed screw inlet. The material to be pelletized is fed by gravity between the inside surface of the die and the extrusion roller, and rotation of the die crushes the material through the holes in the die to form pellets which fall to a collection area below the die.

Fisher, U.S. Pat. No. 2,764,951, discloses a pellet mill employing a perforated annular die and a plurality of rolls mounted within the die for forcing the material to be pelletized through the perforations in the die. The die of Fisher is mounted on a horizontal axis for rotation thereof, and the rollers are mounted on a stationary support within the die. Knives are mounted adjacent the outer surface of the die to cut off the extruded material in pellets of the desired length. An improved version of the Fisher apparatus is disclosed in Curran et al., U.S. Pat. No. 2,887,718.

Cann, U.S. Pat. No. 3,786,645, discloses an apparatus for making compacted pellets of solid phase carbon dioxide. The apparatus of Cann includes an annular die having a plurality of radial extrusion passages therein and a $CO_2$ injector for flashing liquid carbon dioxide to form snow within the die immediately ahead of a compression zone formed by an eccentric impeller mounted for movement around the die. The impeller compacts and extrudes the snow outwardly through the extrusion passages, forming rod-like extrusions of solid phase carbon dioxide. The rod-like extrusions break off under their own weight after leaving the extrusion passages or, may be broken off by a deflector to form pellets of a desired maximum length.

While various type of apparatus for forming pellets are disclosed in the prior art, a need still exists for a pellet forming apparatus which can form pellets from a mixture which includes a liquid component, the apparatus including a means for intermittently expelling the mixture from the interior of the apparatus in discrete portions, the apparatus also capable of operating reliably in a high-volume production capacity.

SUMMARY OF THE INVENTION

A pellet forming apparatus in accordance with the present invention comprises:

(a) means for delivering a flowable medium to be pelletized to a distribution box;

(b) a distribution box which comprises means for intermittently expelling discrete portions of the medium outwardly from the distribution box to form droplets; and (c) means for conveying the droplets in a direction away from the distribution box.

In one embodiment of the present invention, the conveying means may be a conveyor or "chill" belt which is maintained at a temperature below the ambient temperature surrounding the apparatus. The chill belt solidifies the liquid droplets to form pellets. The distribution box may have flow holes formed therethrough, and the means for intermittently expelling may include means for sealingly closing off the flow holes to prevent the medium passing therethrough, and means for alternating the closing means between an open condition and a closed condition.

For a more complete understanding of the present invention, reference is made to the detailed description section. Throughout the following description and in the drawings, identical reference numbers are used to refer to the same or analogous components shown in multiple figures of the drawings, in which:

BRIEF DESCRIPTION OF THE DRAWINGS

FIG. 1 is a side view of the one embodiment of the present invention, partially cut away and partially shown in perspective.

FIG. 2 is a cross-section of a first embodiment of the distribution box, taken along the line 2—2 of FIG. 1.

FIGS. 3 and 4 are side plan views, partially in cross-section, of a second embodiment of a distribution box for use in the present invention.

FIG. 5 is a partial top plan view, partially in cross-section, of the distribution box of FIG. 4, taken along the line 5—5 of FIG. 4.

FIG. 6 is a side view of FIG. 4.

DETAILED DESCRIPTION OF THE PREFERRED EMBODIMENT

Referring to FIG. 1, a first embodiment of a pellet forming apparatus is shown generally at 98, in which a first tank 10 contains a first component of a mixture or medium to be pelletized. Means for raising the temperature of the contents of the first tank 10, such as e.g., heating coils 8 surrounding the tank 10 may be used to liquefy the contents of the tank 10. A regulator 44 controls the flow rate of the first component from the first tank 10 to a feed tube 12 which serves as a means for delivering a medium to be pelletized to a distribution box D. A second tank 17 may provide a second component of the medium to be pelletized. Likewise, a third tank 34 may provide a third component of the mixture or medium. Additional tanks may be used if needed to add further components to the mixture.

A motor 25 is operatively connected to a feed screw 14 and rotates the feed screw 14 to mix the components and move them in the feed tube 12 from the first inlet 9 where the first component enters the feed tube and from the second and third inlets 15, 32 through the feed tube 12 to the distribution box D. The feed screw 14 serves to mix the medium as it is moved down the feed tube 12. A mill or grinder 70 may optionally be interposed the feed tube 12 and the distribution box 20 to ensure more homogeneous and complete mixing of the medium.

A chill belt assembly 28 may be disposed below the distribution box D as shown in FIG. 1, the chill belt assembly 28 serving as a means for conveying the droplets 72 which are the product of the apparatus in a direction away from the distribution box D. The chill belt assembly 28 comprises a conveyor belt 48 having sprayers 29 disposed below the upper segment thereof which spray coolant 46 against the belt 48 to lower the temperature of the portion of the belt 48 which carries the droplets 72 to a temperature below the ambient temperature surrounding the apparatus 98, as shown in FIG. 1. This cooled temperature causes the droplets 72 to solidify on the belt 48 thus forming pellets out of the droplets 72 as they solidify.

Referring now to FIGS. 2 and 6, a first embodiment of a distribution box 20 is illustrated in a substantially parallelepiped shape, although it is not required to be rectangular or any particular shape. However, the distribution box 20 should at least have a side wall 40 and a floor 41 in order to define an interior 67 of the distribution box 20 therebetween for temporarily holding the medium for forming pellets. The distribution box 20 has an inlet 42 and an outlet 43, the inlet 42 being disposed in communication with the feed tube 12. The outlet 43 comprises a plurality of flow holes 45 which communicate with a corresponding number of drop tubes 24. The flow holes 45 are formed through the floor 41 of the distribution box 20 in the embodiment of FIGS. 2 and 6. The floor 41 and side wall 40 of the distribution box 20 define an interior 67 of the distribution box 20 therebetween. This embodiment of the present invention includes means for intermittently expelling discrete portions of the medium outwardly from the distribution box to form droplets. In the distribution box of FIGS. 2 and 6, during this expulsion, the medium moves from the interior 67 of the distribution box 20 through the flow holes 45 and out of the drop tubes 24, as will be described in further detail herein.

In the embodiment of FIGS. 2 and 6, the means for intermittently expelling mixture comprises a rotatable cylinder 49 which is disposed within the distribution box 20, the cylinder 49 having a plurality of holes 52 formed therethrough which are alignable with the flow holes 45. The cylinder 49, as it rotates, provides a means for sealingly closing off the flow holes 45 to prevent the medium passing therethrough. A shaft 50 is attached axially to the cylinder 49 for rotation thereof by a motor 51 or other suitable drive means which provides a means for moving or alternating the cylinder 49 between an open condition and a closed condition of the flow holes 45.

In the open condition, a row of the holes 52 in the cylinder 49 are aligned with the flow holes 45 of the distribution box, and the medium is free to pass from the interior 67 of the distribution box 20 inside of the cylinder 49 through the ends thereof and through the holes 52 in the cylinder 49, and then passes through the flow holes 45 and out of the drop tubes 24 onto the belt 48 of the chill belt assembly 28.

In the closed position of the cylinder 49, the holes 52 in the cylinder 49 are out of alignment with the flow holes 45 so the flow holes are closed off, preventing passage of the medium out of the distribution box 20.

Referring now to FIGS. 3-5, the distribution box D of FIG. 1 in a second embodiment 120 thereof, also comprises a box having a floor 141 and a side wall 140. Flow holes 145 are formed in the floor 141 of the distribution box 120. The distribution box 120 could be substituted into the assembly 98 of FIG. 1 in place of the distribution box D. The distribution box in this second embodiment has in inlet shown at 42 in FIG. 1 and an outlet shown at 143 in FIG. 3. The inlet 42 is disposed in communication with the flow tube 12. The side wall 140 and floor 141 define an interior of the distribution box 120 therebetween for temporarily holding a medium 175 to be pelletized therein. The outlet 143 comprises a plurality of flow holes 145 formed through the floor 141 of the distribution box 120. A means for intermittently expelling discrete portions of the medium 175 outwardly from the outlet 143 to form droplets 72 is provided in this embodiment by the oscillating plate arrangement as depicted in FIGS. 3-5 and described hereinbelow. In this embodiment, a means for sealingly closing off the flow holes 145 comprises a rectangular plate or dish 100 disposed on the floor of the distribution box 120 and supported for slidable movement thereof, the plate 100 having a plaurality of holes 152 formed therethrough which are alignable with the flow holes 145. In addition, in this embodiment, a means for alternating the plate 100 between an open condition and a closed condition comprises a shaft 110 which sealingly protrudes through the distribution box 120 and actuates a cam 115, the shaft and cam being rotated by a motor 157 to cause oscillation of the plate 100 with respect to the distribution box 120, bringing the holes 152 in the plate into and out of alignment with the flow holes 145 in the floor of the distribution box 120. Springs 155 in the distribution box which are made of plastic or a like material which is resistant to breakdown by the alkaline mixture urge the plate 100 toward the cam 115. Other means for oscillating the plate 100 with respect to the distribution box 20 such as a hydraulic piston arrangement may be used, as will be appreciated by those skilled in the art.

In a preferred embodiment, the apparatus 98 may include means for pressurizing the interior of the distribution box to a pressure greater than the ambient pressure outside the apparatus. An air compressor 156 may be used as a pressurizing means as shown in FIGS. 1 and 2.

The pellet forming apparatus of the present invention is particularly suitable for use in forming detergent pellets, in which case the first tank 10 holds a highly alkaline aqueous solution, suspension, or melt. The second and third tanks in forming a detergent mixture hold, e.g., a sequestrant such as a polyphosphate and an active chlorine source, respectively. If an active chlorine source is used in forming the mixture, it should be added last in order to minimize chlorine degradation by making the duration of its time in the mix as short as possible.

The foregoing description is intended to be illustrative, and not restrictive. Many modifications of the present invention will occur to those skilled in the art. All such modifications within the scope of the appended claims are intended to be within the scope and spirit of the present invention.

Having, thus, described the invention, what is claimed is:

1. An apparatus for forming pellets, comprising:
   (a) means for delivering a flowable medium to be pelletized to a distribution box;
   (b) a distribution box having an inlet and an outlet, the inlet being disposed in communication with the means for delivering, the distribution box having a side wall and a floor, the side wall and floor defining an interior of the distribution box therebetween, the outlet comprising a plurality of flow holes formed through the floor of the distribution box;
   (c) means for intermittently expelling discrete portions of the medium outwardly from the outlet to form droplets; and
   (d) means for conveying the droplets in a direction away from the distribution box, the means for intermittently expelling comprising means for sealingly closing off the flow holes to prevent the medium passing therethrough and means for moving the closing means between an open position in which a portion of the medium may pass from the interior of the distribution box to the means for conveying and a closed position in which the flow holes are closed off preventing passage of the medium out of the distribution box, the flow holes being disposed in the floor of the distribution box, the closing means further comprising a rotatable cylinder disposed within the distribution box, the cylinder having holes formed therethrough which are alignable with the flow holes.

2. The apparatus of claim 1, further comprising means for pressurizing the interior of the distribution box to a pressure greater than the ambient pressure outside the apparatus.

3. The apparatus of claim 1 wherein the conveyor means comprises a belt.

4. The apparatus of claim 3 wherein the conveyor means further comprises means for lowering the temperature of a portion of the belt to a temperature below the ambient temperature surrounding the apparatus.

5. The apparatus of claim 1, wherein the moving means comprises a motor, the motor adapted to cause rotation of the cylinder.

6. An apparatus for forming detergent pellets from a mixture, comprising:
   (a) means for delivering a detergent mixture to be pelletized to a distribution box;
   (b) a distribution box having a floor and an interior and being disposed in communication with the means for delivering, the distribution box having a plurality of flow holes formed therethrough;
   (c) a plurality of drop tubes, a drop tube associated with each flow hole and having a passage therethrough for movement of the mixture from the flow hole through the drop tube;
   (d) means for sealingly closing off the flow holes to present the mixture passing from the interior of the distribution box to the drop tubes;
   (e) means for moving the closing means between an open position in which the drop tubes are in communication with the interior of the distribution box, and a closed position in which the drop tubes are closed off from such communication; and
   (f) means for conveying a product of the apparatus in a direction away from the drop tubes wherein the flow holes are disposed in the floor of the distribution box and the closing means comprises a rotatable cylinder disposed within the distribution box, the cylinder having holes formed therethrough which are alignable with the flow holes.

7. The apparatus of claim 6, further comprising means for pressurizing the interior of the distribution box to a pressure greater than the ambient pressure outside the apparatus.

8. The apparatus of claim 6, wherein the conveyor means comprises a belt, and means for lowering the temperature of a portion of the belt to a temperature below the ambient temperature surrounding the apparatus.

9. The apparatus of claim 6, wherein the moving means comprises a motor adapted to cause rotation of the cylinder.

* * * * *